(12) United States Patent
Melli

(10) Patent No.: US 6,804,680 B2
(45) Date of Patent: Oct. 12, 2004

(54) EXTENSIBLE DATABASE

(75) Inventor: Bruno P. Melli, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 502 days.

(21) Appl. No.: 09/780,227

(22) Filed: Feb. 9, 2001

(65) Prior Publication Data

US 2002/0111981 A1 Aug. 15, 2002

(51) Int. Cl.[7] .............................................. G06F 17/30
(52) U.S. Cl. ..................................... 707/102; 707/101
(58) Field of Search ............................... 707/102, 101, 707/104.1, 2, 103 R, 201, 10

(56) References Cited

U.S. PATENT DOCUMENTS

| | | | | |
|---|---|---|---|---|
| 5,974,407 A | * | 10/1999 | Sacks | 707/2 |
| 6,016,497 A | * | 1/2000 | Suver | 707/103 R |
| 6,112,209 A | * | 8/2000 | Gusack | 707/101 |
| 6,457,007 B1 | * | 9/2002 | Kikuchi et al. | 707/10 |
| 6,587,856 B1 | * | 7/2003 | Srinivasan et al. | 707/102 |
| 2002/0038308 A1 | * | 3/2002 | Cappi | 707/104.1 |

* cited by examiner

Primary Examiner—Jean M. Corrielus
Assistant Examiner—Gwen Liang

(57) ABSTRACT

An extensible database system is disclosed for storing data in a plurality of separate, lower-level databases. A top-level database is used to manipulate the data. The top-level database has a property dictionary file that stores the names of properties in the database system, along with references to their locations. An initial database system is created having a plurality of separate databases, each of which may store one or more fields, or properties. References to each of the initial databases are stored in the dictionary file. Thereafter, an added database may be used to add a property, or field, to the database system. The name of the added properties is stored in the dictionary file along with an address pointer to the memory location of the added database. To delete a properties, the reference to that properties is deleted from the property dictionary file and the properties data is removed from memory.

17 Claims, 9 Drawing Sheets

EXTENSIBLE DATABASE

FIELD OF INVENTION

The present invention relates generally to computer software. More particularly, it relates to data storage and databases.

BACKGROUND

In the field of data storage it is desirable to maintain records in a searchable database stored on a computer system. Databases are common means for storing various data, such as employee records, in a matrix-type format. A database may have multiple fields for different data elements. In the example of an employee records database, the fields may include an employee name, birth date, social security number, address, etc. To create a database, the user specifies fields and enters data for each entry in those fields.

Frequently, databases are customized by creating and fixing the number and type of database fields. This creates a problem when the database is required to expand by adding new fields. For example, with a database of employee records, a user might decide that additional information about employees is to be kept such as an employee's starting date, type of vehicle, license plate number, etc.

SUMMARY OF INVENTION

An extensible database system is disclosed for storing data in a plurality of separate, lower-level databases. A top-level database is used to manipulate the data. The top-level database has a property dictionary that stores the names of properties in the database system, along with references to their locations. An initial database system is created having a plurality of separate databases, each of which may store one or more fields. References to each of the initial databases are stored in the dictionary. Thereafter, an added database may be used to add a property, or field, to the database system. The name of the added field is stored in the dictionary along with an address pointer or other reference to the memory location of the added database. To delete a field, the reference to that field is deleted from the property dictionary and the field data is removed from memory.

DETAILED DESCRIPTION

Figure 1A:
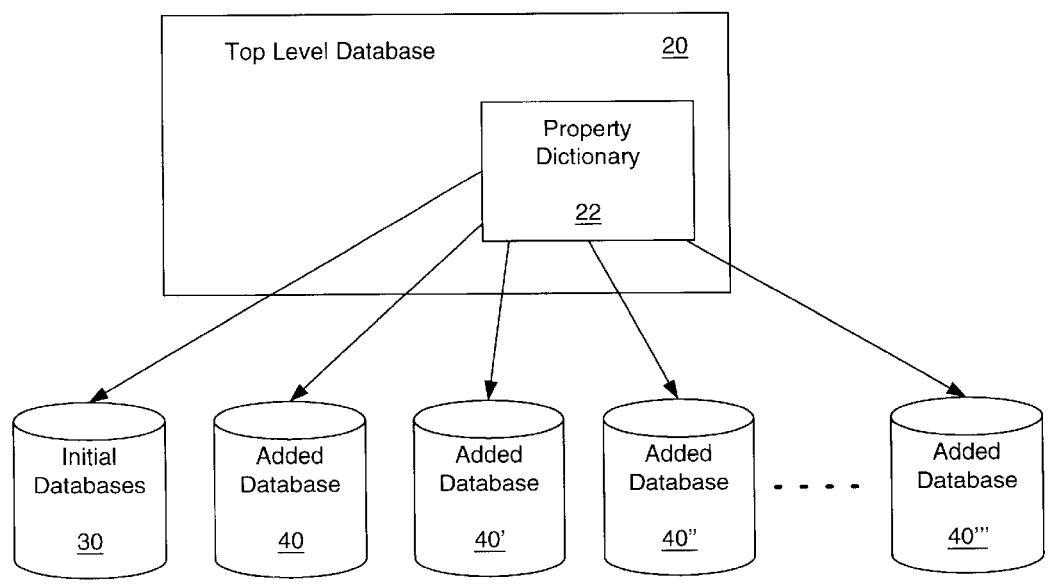
FIGS. 1A and 1B show block diagrams of the extensible database system.

FIG. 1A shows a block diagram of an extensible database system 10 having a top level database 20 that accesses one or more initial databases in an initial database system 30 and one or more added databases 40, 40', 40", 40'''. As used herein, lower-level database refers to either an added database 40 or the initial database system 30. The extensible database system 10 is a collection of conventional databases that store data connected to a top level database 20. In one embodiment, conventional databases having one field are used. The top level database 20 has a property dictionary file 22 that stores information about the fields, or properties, used by the system 10.

Figure 1B:
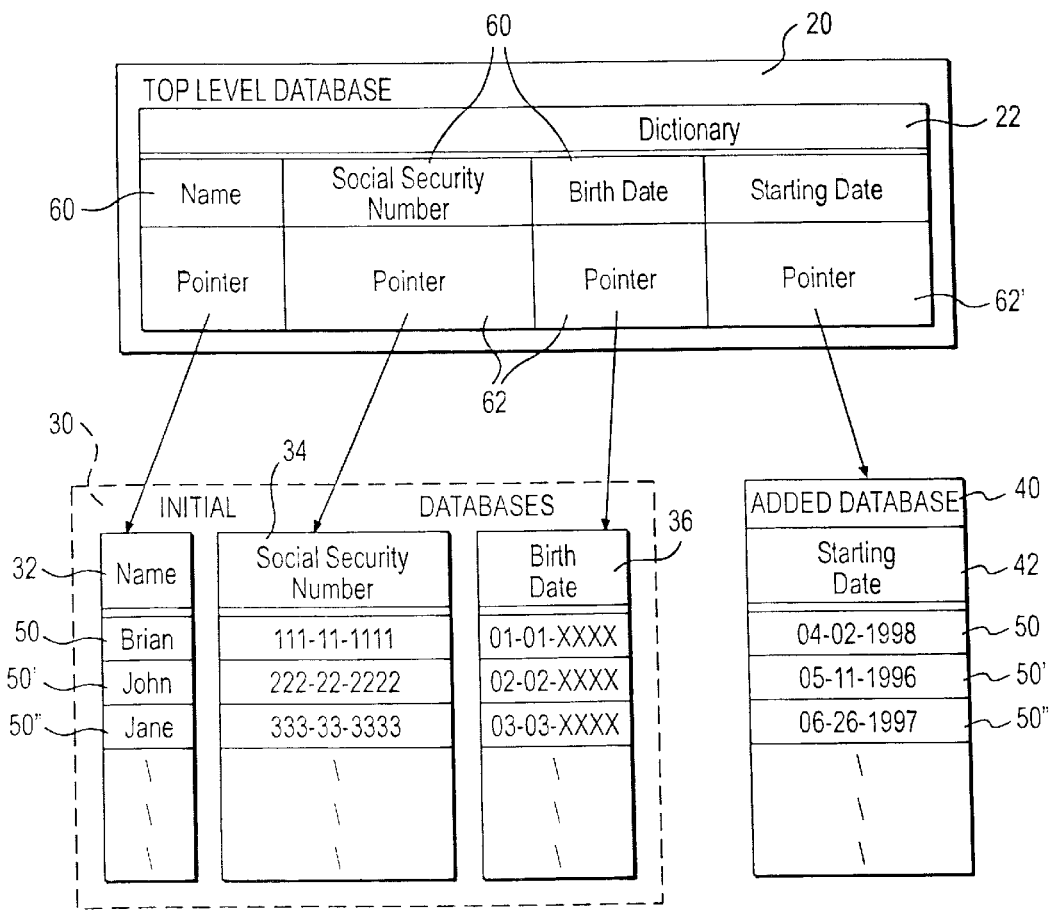

FIG. 1B shows a more detailed block diagram of the extensible database system of FIG. 1A. The database system 10 manages the constituent databases so that data fields 42 may be added by adding a new database 40. The top level database 20 manages the underlying databases 30, 40 using a dictionary file 22 that stores a description of the fields 32, 34, 36, 42 stored in the underlying databases 30, 40 and address pointers to those databases 30, 40.

The initial database system 30 is collection of conventional databases having fields 32, 34, 36 designated when the database system 30 is initially created. In the embodiment shown in FIG. 1B, the initial database system 30 includes fields for employee records, and the fields 32, 34, 36 in the initial database system 30 include an employee's name 32, social security number 34, and birth date 36. In the embodiment shown, each separate field 32, 34, 36 in the initial database system 30 has its own one-field database 32, 34, 36, 40. The initial database system 30 may have numerous data records 50, or entries 50. In the example of FIG. 1B, entries of employee records 50, 50', 50" are shown for employees Brian, John, and Jane.

In use, the database system 10 is accessed through the top level database 20. The top level database 20 has a dictionary file 22 that contains a list of fields 32, 34, 36, 42 supported by the top level database 20. The dictionary file 22 also contains information on the status (open, closed) and location of the underlying databases 30, 40. The top level database 20 supports the usual operations any database system is expected to support such as addition, deletion and lookup of records. In addition, the database system 10 supports addition, deletion, lookup, and listing of entries in the dictionary file 22. To retrieve a full record according to a key, the top level database 20 retrieves individual entries 50 from the underlying databases 32, 34, 36, 40 using the same key, and construct a record with the retrieved data. Additionally, partial records can be constructed if the full record is not needed.

Additional fields 42 may be used by creating an added database 40 having the new field(s) 42. For example, a user of the database system 10 shown in FIG. 1B, may want to add a field 42 for the dates on which employees started working for the employer. Rather than reconfiguring the initial database 30, a new added database 40 is created having the new fields 42 with the new data for the entries 50. A new entry is added to the dictionary file 22, indicating that the top level database 20 now supports one additional field "Starting Date". The data dictionary 22 will in turn create a new lower level database 40 to contain data about employees' starting dates. The data dictionary 22 will also keep a pointer or other type of reference to that new low level database 40 and associate this pointer with the appropriate dictionary entry. The added database 40 is entered into the dictionary file 22, and for each data entry 50, or key value 60, an address pointer 62' is created to reference the location in memory of the new data located in the added database 40. In the example of FIG. 1B, employee Brian's starting date 42 would be located in the added database 40 in the entry 50 corresponding to Brian's key value. One implementation uses address pointers 62' directed to the memory location of the beginning of the added database 40 with offset indexes related to the key values 60 of each data entry 50.

Figure 2:
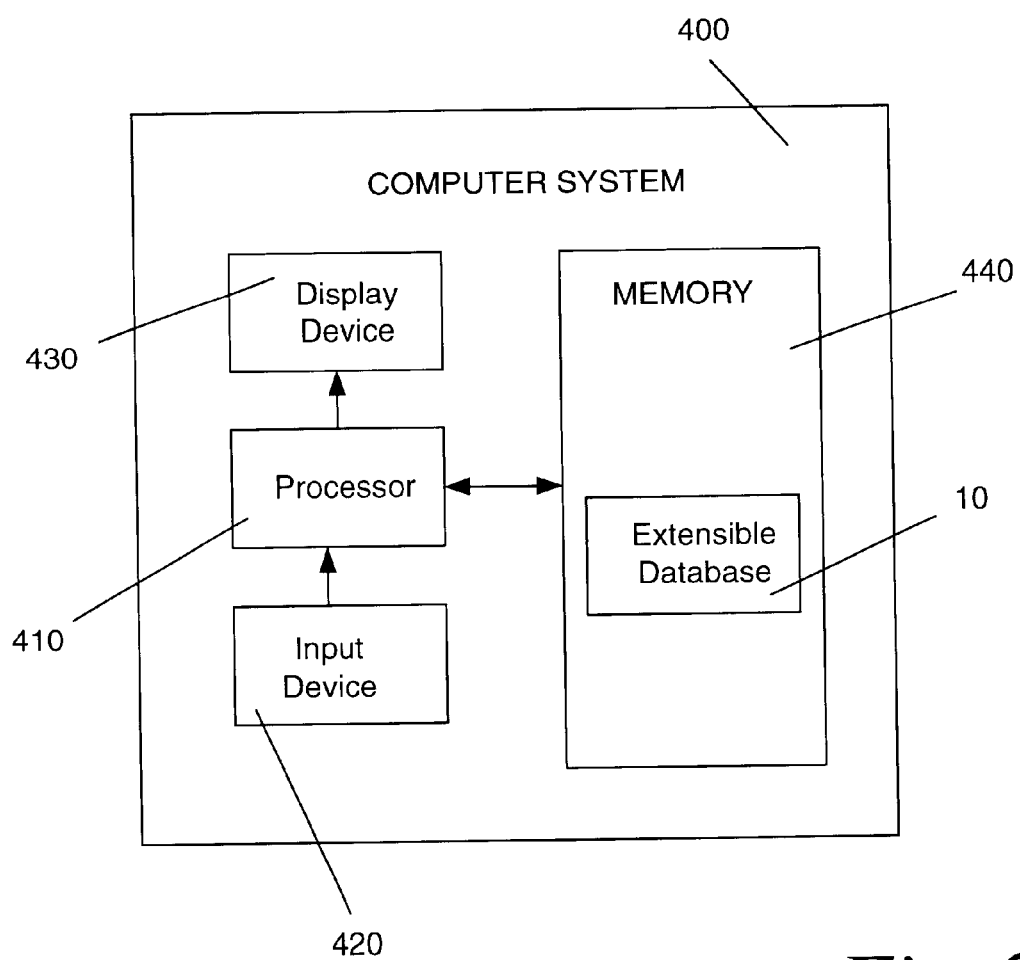
FIG. 2 shows block diagram of a computer system that uses the extensible database system.

FIG. 2 shows a block diagram of a computer system 400 having a processor 410 connected to an input device 420 and a display device 430. The processor 410 accesses memory 440 in the computer system 400 that stores the extensible database system 10. The memory 440 may store the top level database 20, with the dictionary file 22, the initial database 30, and any added databases 40 as needed. In use, the input device 420 receives commands instructing the processor 410 to manipulate the database system 10. For example, the processor 410 may process commands to add a new database 40 or to remove existing data. The display device 430 may display commands entered by the input device 420 and results returned by the processor 410. In one embodiment, the lower-level databases 30, 40 and the dictionary 22 may reside in a read only memory (ROM) portion of the memory 440, such as a hard disk, and the top level database 20 may reside in random access memory (RAM).

Figure 3:
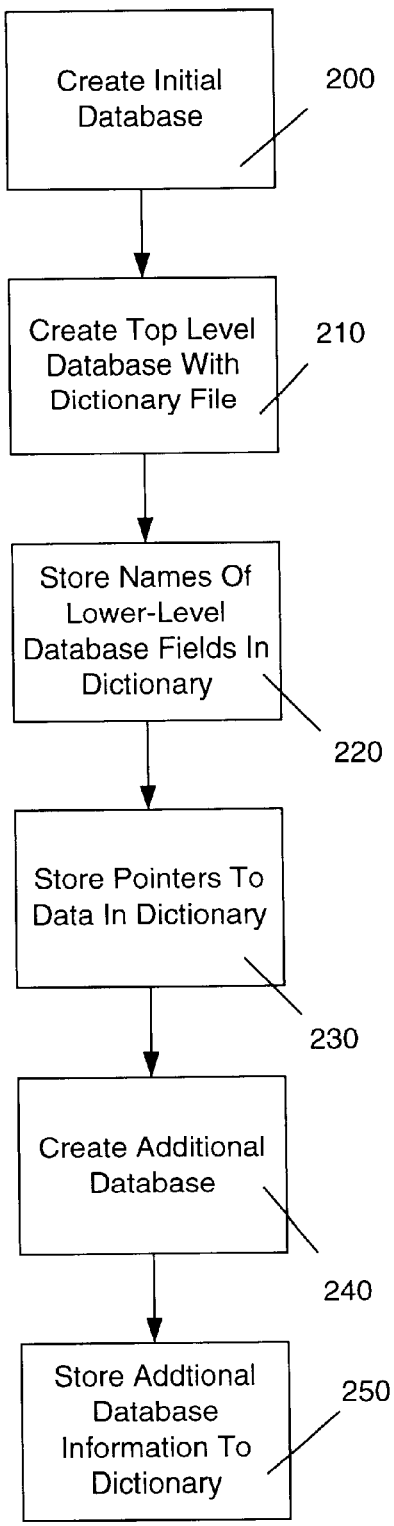
FIG. 3 shows a flow chart of a method for creating an extensible database system.

FIG. 3 shows a flow chart of the method for creating an extensible database system 10. The method may be performed in, for example, the computer system 400 shown in FIG. 2. An initial database system 30 is created 200 having a plurality of fields 32, 34, 36, each of which may be a separate database holding one property 32, 34, 36 and data entries 50. A top level database 20 is created 210 to interface with the processor 410. The top level database 20 has a dictionary file 22 that stores information about the underlying databases 30, 40. The names of the databases 32, 34, 36 in the initial database system 30 are stored 220 to the dictionary 22. Address pointers 62 are stored 230 to the dictionary 22 to indicate the location in memory 440 of the corresponding lower-level databases 32, 34, 36. To create an additional field or fields, a new database 40 is created 240 having one or more new fields 42. The same information stored for the initial database 30 is stored 250 to the additional database 40, including the new fields 42 and the pointers 62, or other types of references. By using the pointer-based system, the extensible database 10 allows different underlying databases 30, 40 to be stored in different locations in memory 440.

FIGS. 4 through 12 show flow charts of various interfaces used by the system 10 to manipulate data. The interfaces can be implemented, for example, in software for execution by a processor 410. The interfaces may be received, for example, as commands input into the input device 420 by a user. Results of data manipulation may be returned through the processor 410 and displayed on the display device 430.

Figure 4:
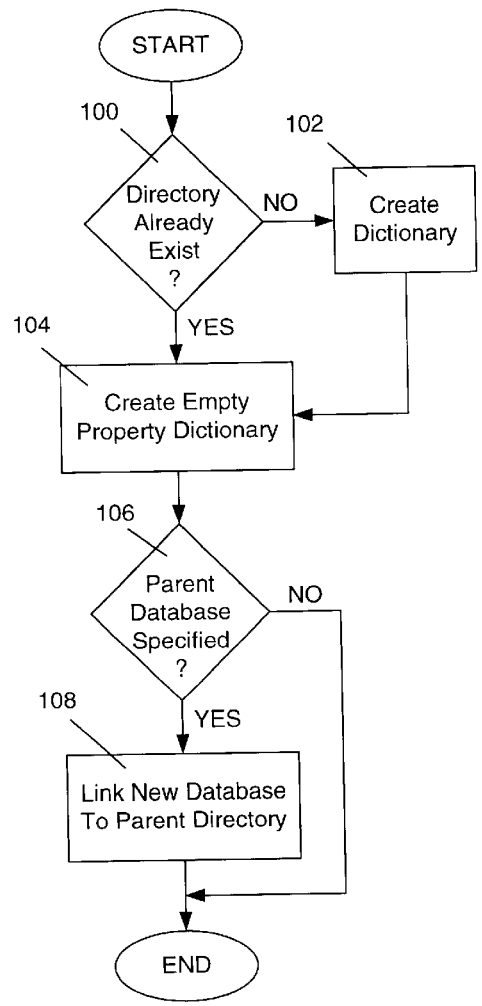
FIG. 4 shows a flow chart of an interface for creating a database.

FIG. 4 shows an interface method for creating a database system 10, which may be in the form "create (directoryName)," where directoryName is the name of the directory where the database will be stored. The system 10 determines 100 whether the specified directory already exists. If it does not yet exist, the directory is created 102. An empty property dictionary 22 is then created 104. The system 10 checks 106 to see if a parent database is specified. If a parent directory is specified, then the new database is linked 108 to the parent directory.

Figure 5:
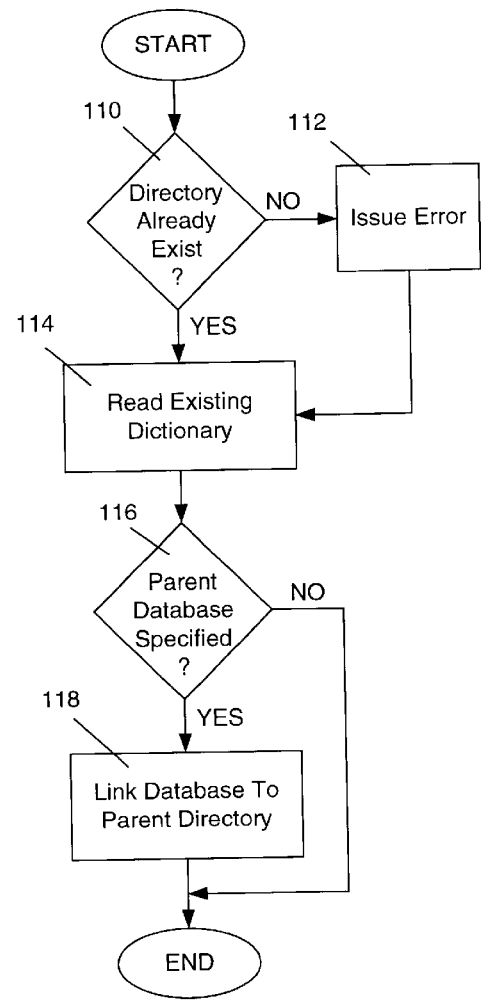
FIG. 5 shows a flow chart of an interface for opening a database.

FIG. 5 shows an interface method for opening a database system 10, which may be performed with the command "open (directoryName)," where directoryName is the name of the directory of the database to be opened. The system 10 determines 110 whether the specified directory already exists. If it does not exist, then an error is issued 112. If the directory does exist, then the existing dictionary 22 for that directory is read 114. If a parent database is specified 116 in the dictionary 22, then the system 10 links 118 the current database to its parent.

Figure 6:
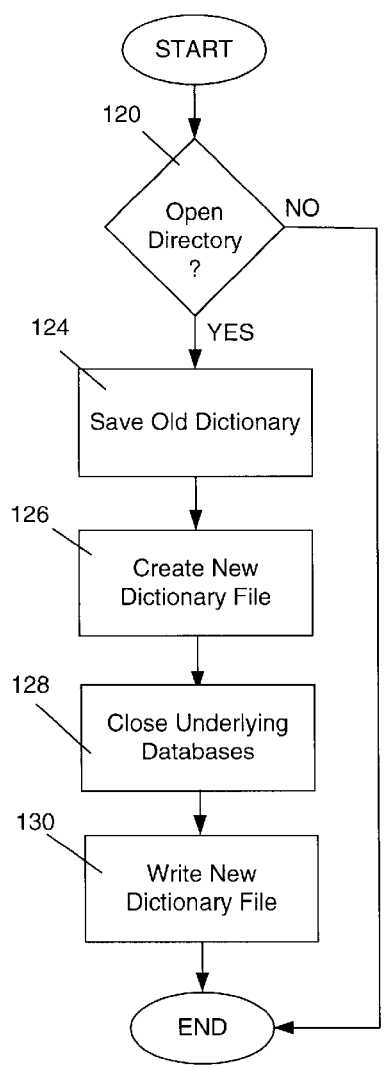
FIG. 6 shows a flow chart of an interface for closing a database.

FIG. 6 shows an interface method for closing a database system 10, which may be performed with the command "close (optional name)," where the optional name is the name of the database to be closed. If a name is specified, the database can be saved under that name; otherwise, a new name is created. The system 10 determines 120 whether the specified directory is open. If the directory sought to be closed is not open, then the system 10 knows that no change has been made and no further action is required. If the directory is open, then the old dictionary 22 for the directory is saved 124. A new dictionary file 22' is created 126, and all underlying databases are closed 128. The new dictionary file 22' is then written 130 with information about the closed database.

Figure 7:
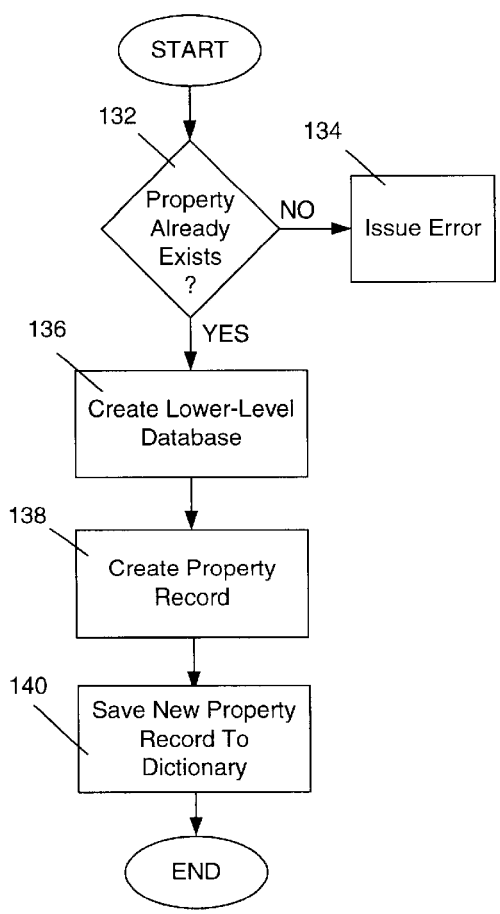
FIG. 7 shows a flow chart of an interface for adding a property to a database.

FIG. 7 shows an interface method for adding a new property, also referred to as a field, to database system 10, which may be performed with the command "addproperty (name)," where name is the name of the property to be added to the database system 10. If the specified property already exists 132, the system 10 issues an error 134. Otherwise, a new lower-level database 40 is created 136. A property record 62' is created 138 for that database 40. The new property record 62' is then stored 140 to the dictionary 22. The property record 62' may be in the form of an address pointers 62' to the added lower-level database 40.

Figure 8:
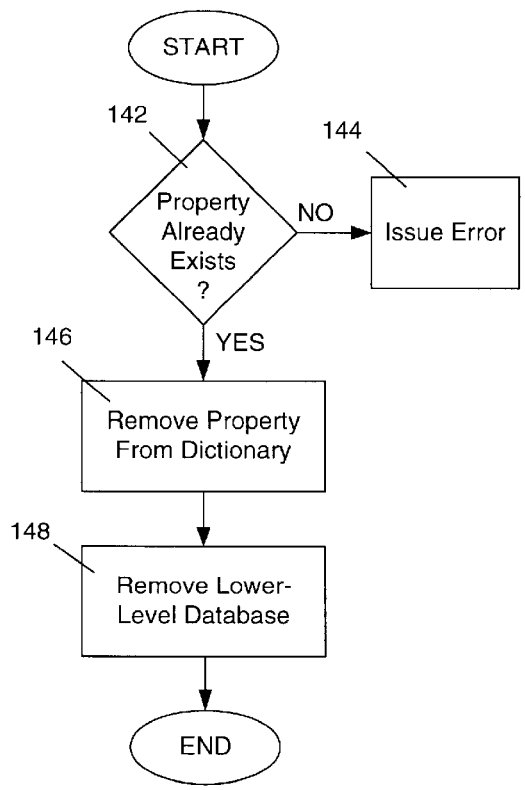
FIG. 8 shows a flow chart of an interface for deleting a property from a database.

FIG. 8 shows an interface method for deleting a property from the database system 10, which may be performed with the command "delete (propertyName)," where propertyName is the name of the property to be deleted from the system 10. The system 10 determines 142 whether the specified property already exists. If it does not exist, then an error is issued 144. Otherwise, the system removes 146 the property from the property dictionary 22 and removes 148 the lower-level database 40 storing that property.

Figure 9:
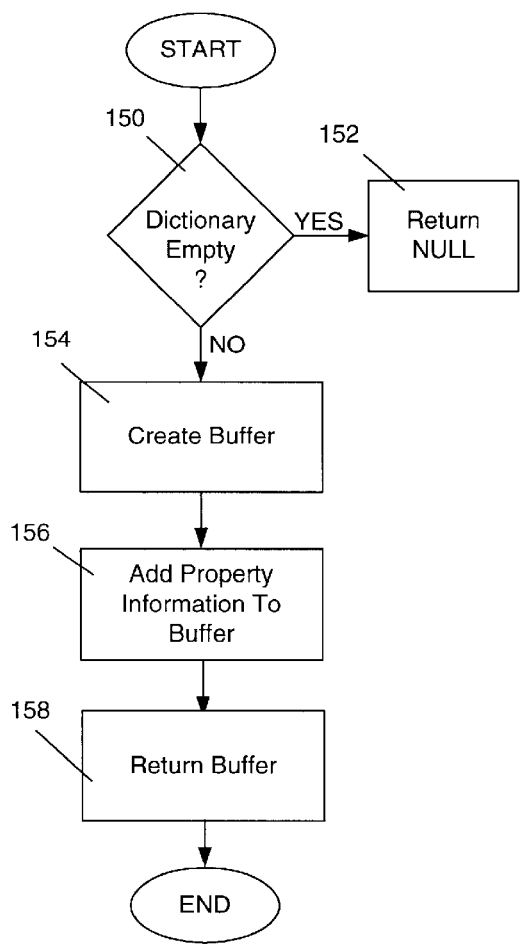
FIG. 9 shows a flow chart of an interface for retrieving a property from a database.

FIG. 9 shows an interface method for retrieving a list of the properties used in the system 10, which may be performed with the command "getPropertyList ( )." If the dictionary 22 is empty 150 (that is, if it has no properties stored in it), then the system 10 returns 152 a null report. Otherwise, a buffer is created 154 in memory 440 to store property information retrieved. The buffer is then filled 156 with the property information, and returned 158 to the user.

Figure 10:
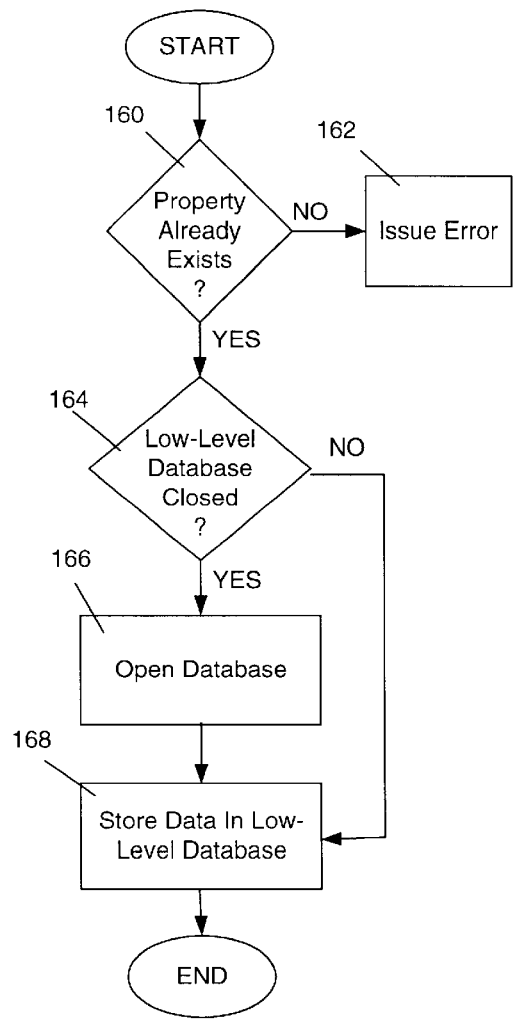
FIG. 10 shows a flow chart of an interface for adding an entry to a database.

FIG. 10 shows an interface method for adding an entry 50 to the database system 10, which may be performed with the command "addEntry (key, property, data, size)." The argument "key" refers to the key value of the data entry to be added, property refers to the file (lower-level database 30, 40) in which the data should be stored, data is the data to be added into the entry, and size is the size of the memory required to store the data entry. If the specified property does not exist 160 in the system 10, then an error is issued 162. Otherwise, the system 10 determines 164 whether a lower-level database 40 is closed. If it is closed, then the system 10 opens 166 it. The data is then stored 168 in the lower-level database 40 in the respective fields 32, 34, 36, 42.

Figure 11:
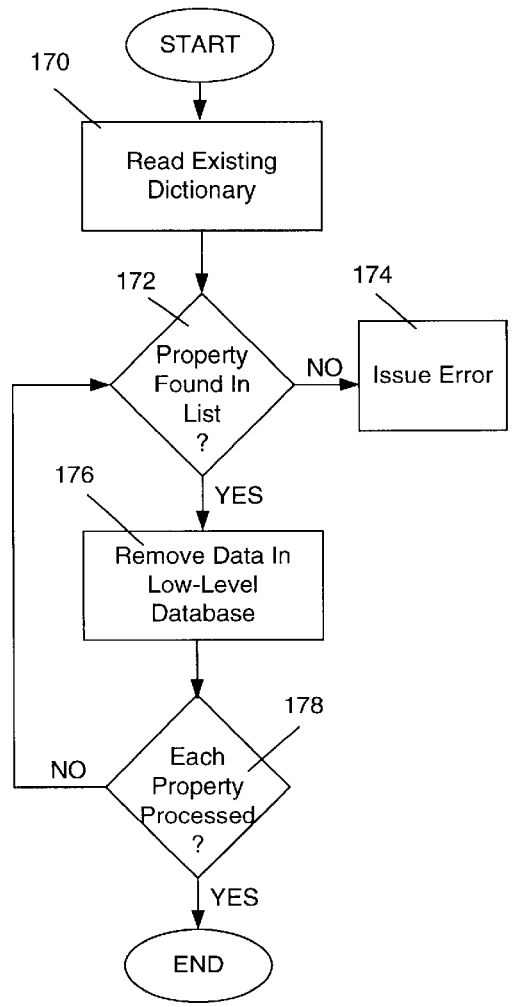
FIG. 11 shows a flow chart of an interface for deleting an entry from a database.

FIG. 11 shows an interface method for deleting an entry 50 in the database system 10, which may be performed with the command "deleteEntry (key, property Regular Expression)." A list of matching properties is generated 170 from the Regular Expression. If a property specified in the command does not appear in the property list 172, then an error is issued 174. For each property found in the list, data corresponding to the property is removed 176 from a lower-level database 30, 40. This process continues until each specified property is deleted 178.

Figure 12:
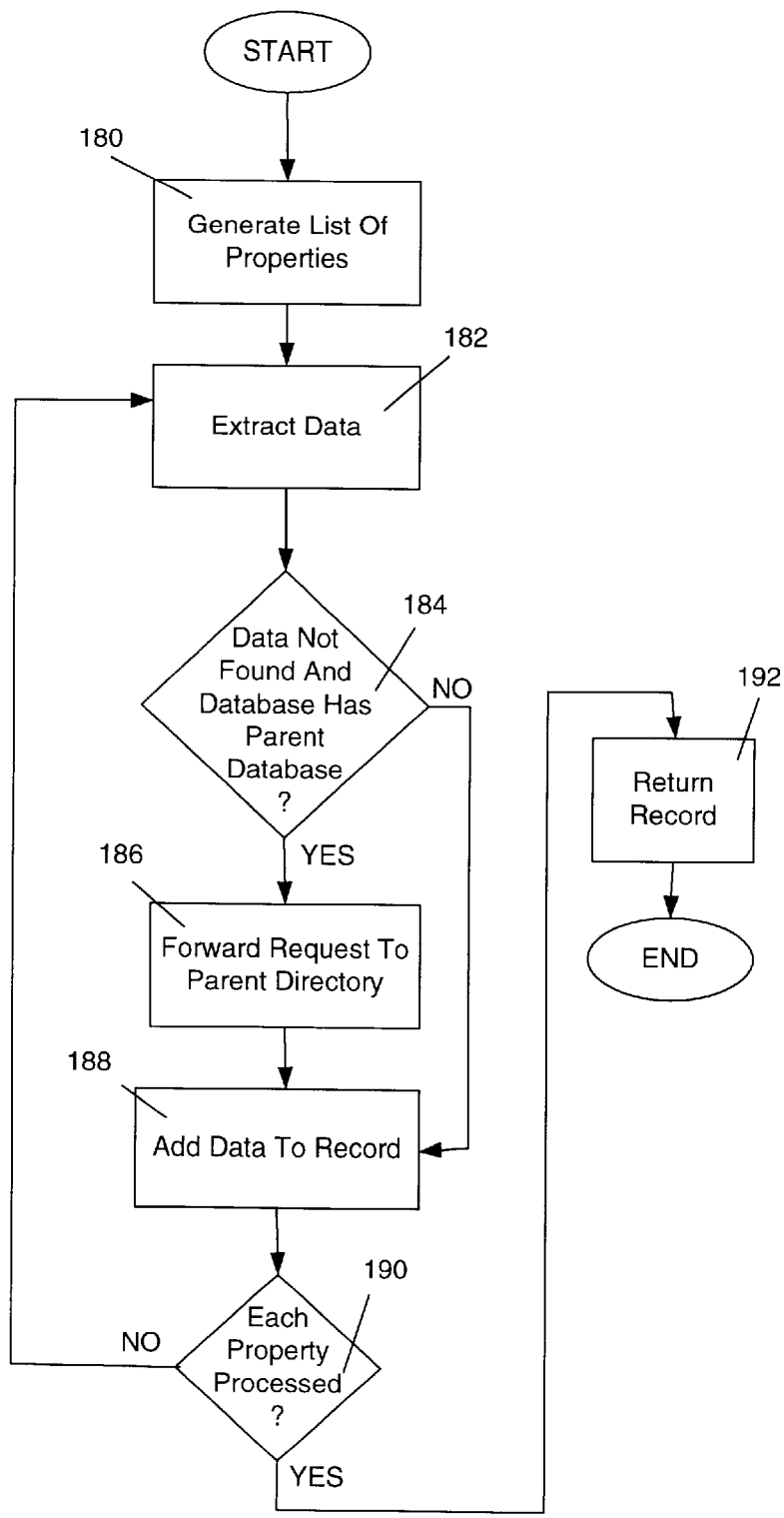
FIG. 12 shows a flow chart of an interface for retrieving an entry from a database.

FIG. 12 shows an interface method for looking up an entry in the database system 10, which may be performed with the command "getEntry (key, property Regular Expression)." A list of matching properties is generated 180 from the Regular Expression. Data is extracted 182 for each property from a lower-level database 30, 40 corresponding to the property 32, 34, 36, 42. If data is not found and the database 30, 40 has a parent database 184, then the request is forwarded 186 to the parent directory. The data is added 188 to a record to be returned to the user. This process 182, 184, 186, 188 continues until each property is processed 190. Then, a record having this information is returned 192 to the user.

Although the present invention has been described with respect to particular embodiments thereof, variations are possible. The present invention may be embodied in specific forms without departing from the essential spirit or attributes thereof. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or read-only memory (ROM). In one embodiment, one portion of the system, such as the lower-level databases 30, 40, may be stored in a ROM portion of the memory 440, while another portion of the system, such as the top level database 20, may be stored in a RAM portion of the memory 440. It is desired that the embodiments described herein be considered in all respects illustrative and not restrictive and that reference be made to the appended claims and their equivalents for determining the scope of the invention.

I claim:

1. A method for storing data comprising:

creating an initial database system having at least one lower-level database having a plurality of data entries and a property;

creating a top-level database that accesses the initial database system;

determining if a specified dictionary file exists in the top-level database;

if the specified file does not exist, creating a dictionary file in the top-level database, wherein the dictionary file contains a list of properties supported by the top-level database;

storing in the dictionary file a name of the property in the at least one lower-level database, an open or close status of the at least one lower-level database, a reference to a location of a corresponding lower-level database that stores the property, and a key value for the at least one lower-level database, wherein an offset index related to the key value is used to identify data for a data entry in the at least one lower-level database;

adding to the dictionary file a new entry, indicating that the top-level database supports an added property;

creating an added lower-level database having the added property; and storing in the dictionary file the name of the added property, an open or close status of the added lower-level database, a reference to a location of the added lower-level database that stores the added property, and a key value for the added lower-level database.

2. The method of claim 1, wherein the step of creating an initial database system comprises creating a plurality of initial databases, each of which stores one property and a plurality of data entries.

3. The method of claim 1, wherein the reference is an address pointer to a memory address of data.

4. The method of claim 3, wherein the address pointer references a location in a memory.

5. The method of claim 1, further comprising using a plurality of application program interfaces to manipulate data stored in the data entries using the top level database, the interfaces comprising:

a first interface for adding a property by creating an added database and storing a reference to the added property to the dictionary file;

a second interface for deleting a property by deleting a lower-level database that stores information about the deleted property, and removing from the dictionary file a reference to the deleted property;

a third interface for adding a data entry; and a fourth interface for deleting a data entry.

6. The method of claim 5, the interfaces further comprising:

a fifth interface for retrieving a list of properties by accessing the dictionary file; and a sixth interface for retrieving a data entry by accessing the dictionary file.

7. A computer-readable medium having stored thereon a data structure comprising:

an initial database system having a plurality of lower-level databases having a plurality of data entries and properties; and a top-level database accessing the initial database system and the plurality of lower-level databases using a dictionary file created in the top-level database, wherein the dictionary file contains a list of properties supported by the top-level database, and wherein the dictionary file stores names of the properties, an open or close status of each of the plurality of lower-level databases, references to locations of the plurality of lower-level databases that store the properties, and key values for the plurality of lower-level databases, wherein offset indexes related to the key values are used to identify data for data entries in the plurality of lower-level databases, and wherein an added lower-level database is created by adding to the dictionary file a new entry indicating that the top-level database supports an added property, creating the added lower-level database having the added property, storing in the dictionary file the name of the added property, an open or close status of the added lower-level database, a reference to a location of the added lower-level database that stores the added property, and a key value for the added lower-level database.

8. The medium of claim 7, wherein the plurality of lower-level databases comprise a plurality of databases, each having one property.

9. The medium of claim 7, wherein the references to data in the initial database system are address pointers to memory addresses of the data, and wherein the address pointers reference locations in a memory.

10. The medium of claim 7, further comprising a plurality of application program interfaces to manipulate data stored in the data entries using the top level database, the interfaces comprising:

a first interface for adding a property by creating an added database and storing a reference to the added property to the dictionary file; and a second interface for deleting a property by deleting a lower-level database that stores information about the deleted property, and removing from the dictionary file a reference to the deleted property.

11. The medium of claim 10, the interfaces further comprising:

a third interface for adding a data entry to the plurality of lower-level databases; and a fourth interface for deleting a data entry from the plurality of lower-level databases.

12. The method of claim 11, the interfaces further comprising:

a fifth interface for retrieving a list of properties by accessing the dictionary file; and a sixth interface for retrieving a data entry by accessing the dictionary file.

13. A computer system for creating an extensible database, comprising:

a storage medium; and a processor for executing a software program stored on the storage medium for creating an extensible database, the software program comprising a set of instructions for:

creating an initial database system having a plurality of lower-level databases, each having a plurality of data entries and a property;

creating a top-level database that accesses the initial database system and the plurality of lower-level databases;

determining if a specified dictionary file exists in the top-level database;

if the specified file does not exist, creating, a dictionary file in the top-level database, wherein the dictionary file contains a list of properties supported by the top-level database;

storing in the dictionary file a name of the property in each of the plurality of lower-level databases, an open or close status of each of the plurality of lower-level databases, a reference to a data storage location of each of the plurality of lower-level databases that store the property, and a key value for each of the plurality of lower-level databases, wherein an offset index related to the key value is used to identify data for a data entry in the plurality of lower-level databases;

adding to the dictionary a new entry, indicating that the top-level database supports an added property;

creating an added lower-level database having the added property; and storing in the dictionary file the name of the added property, an open or close status of the added lower-level database, a reference to a location of the added lower-level database that stores the added property, and a key value for the added lower-level database.

14. The system of claim 13, wherein the reference is a pointer to a memory address of data.

15. The system of claim 14, wherein the address pointer references a location in a memory.

16. The system of claim 13, wherein the step of creating a plurality of lower-level databases comprises creating the lower-level databases in a read-only memory (ROM) portion of the storage medium, and wherein the step of creating a top level database comprises creating a top-level database in a random access memory (RAM).

17. The system of claim 13, wherein the software program further comprises a plurality of application program interfaces to manipulate data stored in the data entries using the top-level database, the interfaces comprising:

a first interface for adding a property by creating an added database and storing a reference to the added property to the dictionary file; and a second interface for deleting a property by deleting a lower-level database that stores information about the deleted property, and removing from the dictionary file a reference to the deleted property.

* * * * *